United States Patent [19]
Santeler et al.

[11] Patent Number: 5,408,636
[45] Date of Patent: Apr. 18, 1995

[54] SYSTEM FOR FLUSHING FIRST AND SECOND CACHES UPON DETECTION OF A WRITE OPERATION TO WRITE PROTECTED AREAS

[75] Inventors: Paul Santeler, Cypress; Gary W. Thome; Roger E. Tipley, both of Houston, all of Tex.

[73] Assignee: Compaq Computer Corp., Houston, Tex.

[21] Appl. No.: 255,233

[22] Filed: Jun. 7, 1994

Related U.S. Application Data

[63] Continuation of Ser. No. 720,234, Jun. 24, 1991, abandoned.

[51] Int. Cl.$^6$ .............................................. G06F 13/12
[52] U.S. Cl. ................................ 395/425; 364/243.4; 364/964.343
[58] Field of Search ... 364/200 MS File, 900 MS File; 395/400, 425

[56] References Cited

U.S. PATENT DOCUMENTS

| | | | |
|---|---|---|---|
| 5,210,845 | 5/1993 | Crawford et al. | 395/425 |
| 5,325,499 | 6/1994 | Kummer et al. | 395/425 |

OTHER PUBLICATIONS

"i486 Processor Hardware Reference Manual", Intel Corporation, 1990, pp. 3-1-3-11 and 6-32-6-33.
"A Secondary Cache Controller Design for a High-End Microprocessor", Yong S. Lee, IEEE Journal, Nov. 11, 1991, pp. 1141–1146.
Microprocessors, vol. I, Intel, 1992; pp. 4–266 to 4–275.
Microprocessors, vol. I, Intel, 1992; pp. 2–80 to 2–81, 2–89 to 2–90.

*Primary Examiner*—Reba I. Elmore
*Attorney, Agent, or Firm*—Pravel, Hewitt, Kimball & Krieger

[57] ABSTRACT

A computer system that flushes an internal cache in the microprocessor and an external cache to insure cache coherency. The computer system will flush the caches when a write command is directed to those specific portions that are write protected. The microprocessor is placed in a hold state before the flushing process is initiated. The cache memories are then cleared. Thus the microprocessor will not be able to read the incoherent information stored in the cache and yet data obtained during read operations can be cached for performance increase.

4 Claims, 7 Drawing Sheets

SYSTEM FOR FLUSHING FIRST AND SECOND CACHES UPON DETECTION OF A WRITE OPERATION TO WRITE PROTECTED AREAS

This is a continuation of application Ser. No. 07/720,234 filed on Jun. 24, 1991, abandoned.

BACKGROUND OF THE INVENTION

1. Field of the Invention

The invention relates to cache memory systems in computer systems, and more particularly to an apparatus which flushes the cache memory when certain memory sensitive operations occur.

2. Description of the Related Art

The computer industry is a vibrant and growing field that continues to evolve as new innovations occur. The driving force behind this innovation has been the increasing demand for faster and more powerful computers. A major bottleneck in computer speed has historically been the speed with which data can be accessed for memory, referred to as the memory access time. The microprocessor, with its relatively fast processor cycle times, has generally had to wait during memory accesses to account for the relatively slow memory access times. Therefore, improvement in memory access times has been one of the major areas of research in enhancing computer performance.

In order to bridge the gap between fast processor cycles times and slow memory access times, cache memory was developed. A cache is a small amount of very fast, and expensive, zero wait state memory that is used to store a copy of frequently accessed code and data from system memory. The microprocessor can operate out of this very fast memory and thereby reduce the number of wait states that must be interposed during memory accesses.

The management or control of the cache is generally performed by a device referred to as a cache controller. The cache controller is principally responsible for keeping track of the contents of the cache as well as controlling data movement into and out of the cache. Another responsibility of the cache controller is the preservation of cache coherency, which refers to the requirement that the copy of system memory held in the cache be identical to the data held in system memory. In addition, the cache controller is responsible for determining which memory addresses are capable of residing in the cache, referred to as cacheable addresses. Certain segments of addressable memory may not be allowed to reside in the cache due to cache coherency or other considerations. For example, memory that is read only or write protected is sometimes designated as non-cacheable to prevent these locations from being modified in the cache. The cache controller is therefore responsible for preventing data from non-cacheable addresses from being placed in the cache.

There are generally two types of cache memory systems: write-through and write-back. In a write-through cache design all writes are often stored in the cache and are always broadcast to the memory. In a write-back cache design, the writes are performed only to the cache, with the cache only providing the information to the system when another party requests the address. Thus, when a write hit occurs in a write-back cache, the cache location is updated with the new data, but the write operation is not broadcast to system memory. In this instance, the cache holds a modified copy of the data and assumes the responsibility of providing this modified copy to other requesting devices. When the cache holds a modified copy of data, the respective memory location in system memory is now said to hold incorrect or dirty data. Therefore, in a write-back cache, the cache controller is required to snoop the system bus when it does not have control of the system bus to determine if other devices request memory locations where the cache holds a modified copy of data at the respective location. If so, the cache controller must write back the modified data to system memory so that the requesting device can receive the correct copy of data. Also, when a cache flush occurs, a write-back cache must write back all modified locations to system memory when the flush occurs.

Background on memory relocation schemes in computer systems is deemed appropriate. A common method of maximizing system efficiency is to copy the basic input/output system (BIOS) from read only memory (ROM) into dynamic random access memory (DRAM). Because the RAM is often 32 bits wide and the ROM is only 16 bits wide, and because the memory access time for RAM is much shorter than the access time for ROM, the memory access time is greatly enhanced. One common method for accomplishing ROM relocation is to copy the ROM data to RAM located in high memory. The memory map is then altered to enable the high memory RAM to be addressed where the ROM was previously addressed. For example, in computer systems developed by Compaq Computer Corporation, the system ROM-BIOS is originally located at memory address E0000h to FFFFFFh. After power-up of the computer system, the code in the system ROM is copied to memory address FE0000h to FFFFFFh. The physical memory block starting at memory address FE0000h may then be remapped to memory address E0000h to FFFFFh, where the ROM was originally addressed.

When the BIOS is stored in ROM, the BIOS cannot be changed by software. However, after the BIOS is copied into RAM, the BIOS can be changed by writing new data to the RAM. Therefore, it is a common practice to designate the portions of the RAM in which the BIOS is stored as write-protected to prevent software from modifying these locations. The respective areas of RAM are write-protected by setting a bit referred to as a write-protect bit in a status register associated with the memory. When the write protect bit is set, write operations to that area do not alter the stored data and information sent to write-protected areas is usually lost. Nonetheless, some software programs or users are able to alter the contents of the BIOS stored in write-protected RAM. In order to do so, a user simply clears the write protect bit, changes the RAM where the BIOS is located, and then resets the write protect bit after the changes have been completed.

In order to further enhance system performance, portions of the BIOS may be cached so that frequently used portions of the BIOS are immediately available to the microprocessor through the cache. However, if the cache controller does not understand write-protection and for those areas caches only reads and not writes, then problems may develop. If the user were to write to the write-protected area, the cache controller would cache the location but the data would never actually be stored at the main memory location. This is true of both write-through and write-back caches. This then results in a cache incoherency problem. Because the cache controller does not understand write-protection, the previous way to resolve the write protection problem was to indicate that the write-protected memory areas were noncacheable. But this provided a large performance drop because the area, especially the BIOS area, was not being cached.

The i486 from Intel Corporation (Intel) had an internal cache with such problems. The C5 or 82495 cache controller from Intel, which was designed as a secondary cache to the i486, was aware of write-protected areas, and indeed cached the write-protect status for each location. However, to resolve the cache coherency problem mentioned above, whenever a write-protected area was accessed, the C5 cache controller would cache the data in the external cache on reads, but would indicate the location was noncacheable to i486. While this was a slight improvement in that access need only be made to the secondary or external cache, the internal cache on the i486 still was not caching the location and there was a performance degradation. It is therefore desirable to be able to utilize a first level cache system which does not understand write-protected areas and a second level cache system which does understand write-protection but does not allow the first level cache to cache those areas so that all read operations would be cached in the first level cache as well as the second level cache but incoherencies would not develop on write cases.

SUMMARY OF THE INVENTION

A computer system according to the present invention flushes internal and external microprocessor caches on certain conditions to maintain write protect status and ensure cache coherency. The computer system includes a microprocessor, such as the i486, having an internal cache system which does not understand write-protection but allows only caching or no caching of given locations in conjunction with a cache controller which understands write-protected areas but indicates to the internal cache that the areas are noncacheable. According to the present invention, the write-protected areas we indicated as being cacheable to both caches, thus allowing caching of the read operations at both levels. The computer system flushes both caches when a write operation is directed to a portion of the memory that is designated as write protected to maintain the write protect status of these areas. In the case of a write-back external cache, such as the C5 cache controller, the areas are designated as write-through. When a write operation occurs to the write protected area then both the internal and external caches are flushed.

The processor is placed in a hold state before the flushing process is initiated. During the flush operation, modified data contained in the external cache memory is written back to the RAM in the case of a write-back cache controller so that valid lines of modified data are not lost. Thus, the cache memory is flushed to maintain the write protect status of certain areas and the cache coherency of data stored in the cache.

THE BRIEF DESCRIPTION OF THE DRAWINGS

A better understanding of the present invention can be obtained when the following detailed description of the preferred embodiment is considered in conjunction with the following drawings, in which.

DESCRIPTION OF THE PREFERRED EMBODIMENT

Figure 1:
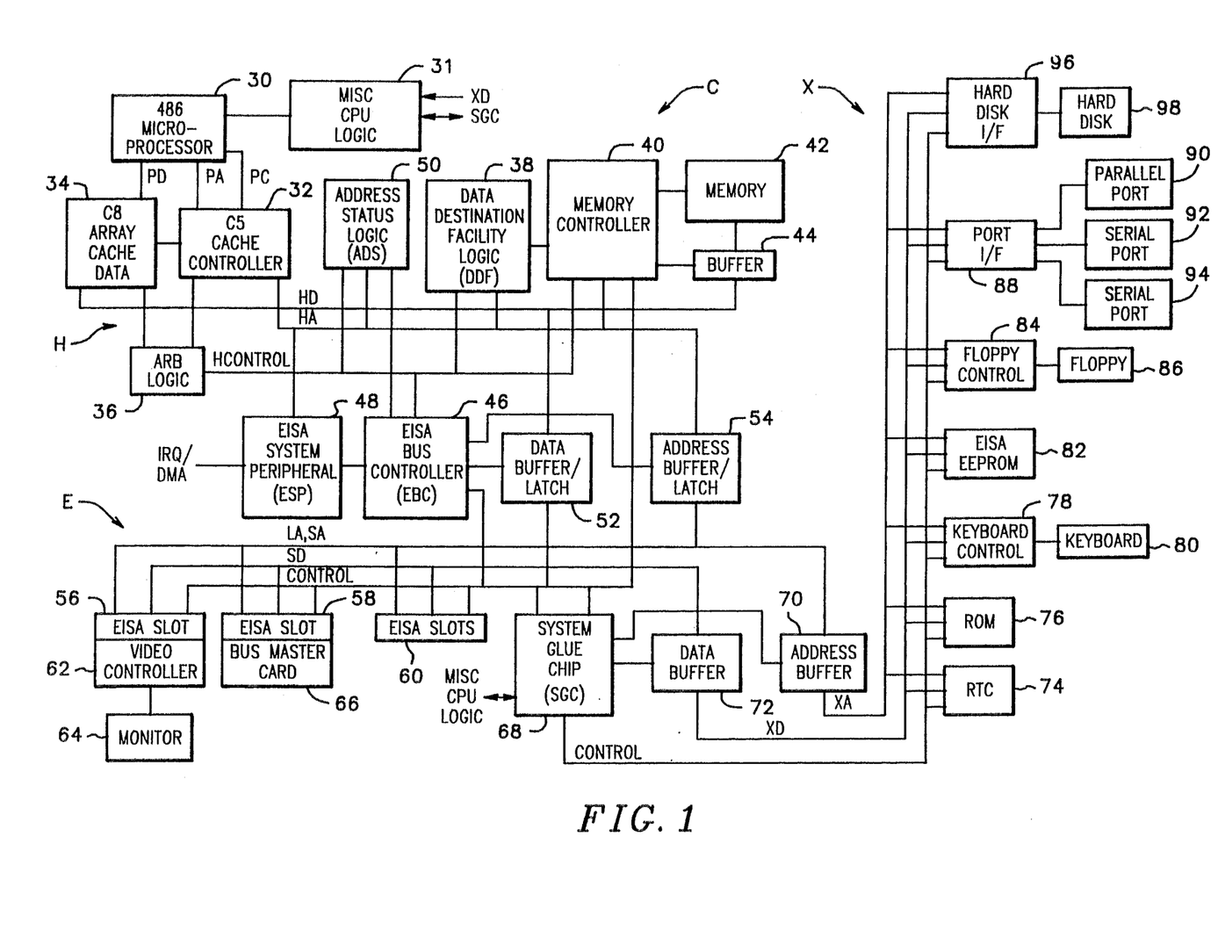
FIG. 1 is a block diagram of a computer incorporating the present invention.

Referring now to FIG. 1, a computer system generally referred to by the letter C incorporating the present invention is shown. The foundation of a computer system C according to the present invention is a microprocessor 30, preferably the i486 from Intel Corporation (Intel). The processor 30 preferably includes an internal cache. Connected to the microprocessor 30 is miscellaneous CPU logic 31 to support various microprocessor operations. Also connected to the microprocessor 30 is a cache subsystem comprising a cache controller 32, preferably the C5 or 82495 cache controller by Intel, and an array of cache data RAMs 34, preferably the C8 or 82490 data RAMs also from Intel. The microprocessor 30, the cache controller 32 and the cache data RAMs 34 are connected as indicated and specified by Intel. Preferably the components are the 50 MHz versions. To this end the processor data bus PD is connected to the data RAMs 34 and the processor address bus PA and the processor control bus signals PC are connected to the cache controller 32. The cache controller 32 and the cache data RAMs 34 are also connected by various control signals. The miscellaneous CPU logic 31 includes logic according to the present invention which flushes the cache data RAMs 34 and the internal cache in the processor 30 when certain conditions occur, and this logic is described in detail below.

The cache controller 32 and the cache data RAMs 34 are coupled to a bus generally referred to as the host bus H which includes a host data bus HD portion, a host address bus HA portion and a host control bus HCONTROL portion. Arbitration logic 36 produces some control signals in the HCONTROL bus from signals provided by the cache controller 32 and the cache data RAMs 34. The HCONTROL bus includes signals such as the memory read or write signal, the memory or input/output signal, various address and data strobes and so on as commonly utilized by the various other elements in the computer system C. Certain of these signals are explained in more detail below.

Connected to the host bus H is a memory subsystem including data destination facility (DDF) logic 38, a memory controller 40, memory 42 and a memory data buffer 44. The DDF logic 38 provides address translation and memory module activation and is more completely described in U.S. patent application 431,666 filed Nov. 3, 1989 and in its European Patent Office counterpart having an application number of 90 311 749.7 and a filing date of Oct. 26, 1990, which was published on May 8, 1991, both of which are hereby incorporated by reference. The memory controller 40 provides the various control functions necessary to allow the various units operating on or over the host bus H to interact with the actual memory devices 42. The memory 42 is comprised of a series of page mode dynamic random access memories (DRAMs) arranged in an interleaved format. The memory controller 40 includes the necessary functions to control the operation of the DRAMs and of the data buffer 44.

In the preferred embodiment, the computer system C utilizes the EISA or Extended Industry Standard Architecture for the external bus. The EISA bus is generally referred to by the letter E in the Figure. The EISA bus E is comprised of several portions, the LA and SA address buses, the SD data bus and the ECONTROL control bus. A bus controller 46 referred to as the EBC, preferably one compatible with the 82358 from Intel, provides certain of the necessary control functions between the host bus H and the EISA bus E. Connected to the EBC 46 is the EISA system peripheral (ESP) 48, preferably one such as the 82357 from Intel, which includes various timers, the direct memory access (DMA) controller and the interrupt controller logic of the computer system C. Also connected to the EBC 46 is ADS or address strobe logic 50. The ADS logic 50 is used to convert certain differences in the various strobes from the cache controller 32 to those necessary for use by the EBC 46. The EBC 46 controls a data buffer/latch 52 connected between the host data bus HD and the external data bus SD and an address buffer/latch 54 connected between the host address bus HA and the external address buses LA and SA in the EISA bus E. Connected to the EISA bus E are a series of EISA slots 56, 58 and 60 according to the EISA convention. In the preferred embodiment, the EISA slot 56 is preferably a special slot having a pin adapted for special operations with a video controller 62. A monitor 64 is connected to the video controller 62. Additionally in the disclosed embodiment, one of the general purpose EISA slots 58 includes a bus mastering card 66 which operates according to the EISA specification. The bus mastering card allows high performance data transfers over the EISA bus E. As an example, the bus master card 66 may be a high performance disk controller which transfers information from the attached hard disk devices directly into the memory 42. It is noted that the bus master card 66 could be either an EISA bus master or an ISA bus master. The remaining EISA slots are generally referred to by the number 60 and in a typical design would include up to 6 slots for insertion of either other EISA cards or conventional ISA cards as readily available.

A fourth general bus referred to as the X bus is also present in the computer system C. The X bus is developed from the EISA bus E by means of a system glue chip (SGC) 68, which performs numerous address decoding operations an address buffer 70 and a data buffer 72. The SGC 68 controls the operation of the data buffer 72 and the address buffer 70, as well as providing various strobes over an X control bus to the miscellaneous devices contained on the X bus. Additionally, the SGC 68 is connected to the miscellaneous CPU logic 31 to implement communications using a reduced number of addressing lines, as more fully described in U.S. patent application 431,659 filed Nov. 3, 1989 and in its European Patent Office counterpart having an application number of 90 120 923.9 and a filing date of Oct. 31, 1990, which was published on May 8, 1991, both of which are hereby incorporated by reference.

The first item contained on the X bus is a real time clock (RTC) 74, which contains the necessary CMOS memory and clock functions utilized in the computer system C. A read only memory (ROM) 76 includes the necessary basic operating software utilized in the computer system C and communicates over the X bus. A keyboard controller 78 is connected to the X bus and has connected to it a keyboard 80 to allow data entry. Optionally the keyboard controller 78 can include a second interface for a pointing device (not shown). An electrically erasable programmable read only memory (EEPROM) 82 is connected to the X bus to retain the extended set up information required for an EISA system relating to board configuration. A floppy controller 84 is connected to the X bus and has connected to it a floppy disk drive 86. A port interface circuit 88 is connected to the X bus and provides a parallel port 90 and two serial ports 92 and 94. Further, a hard disk interface 96 is connected to the X bus, with a hard disk 98 being connected to the interface 96.

Figure 2:
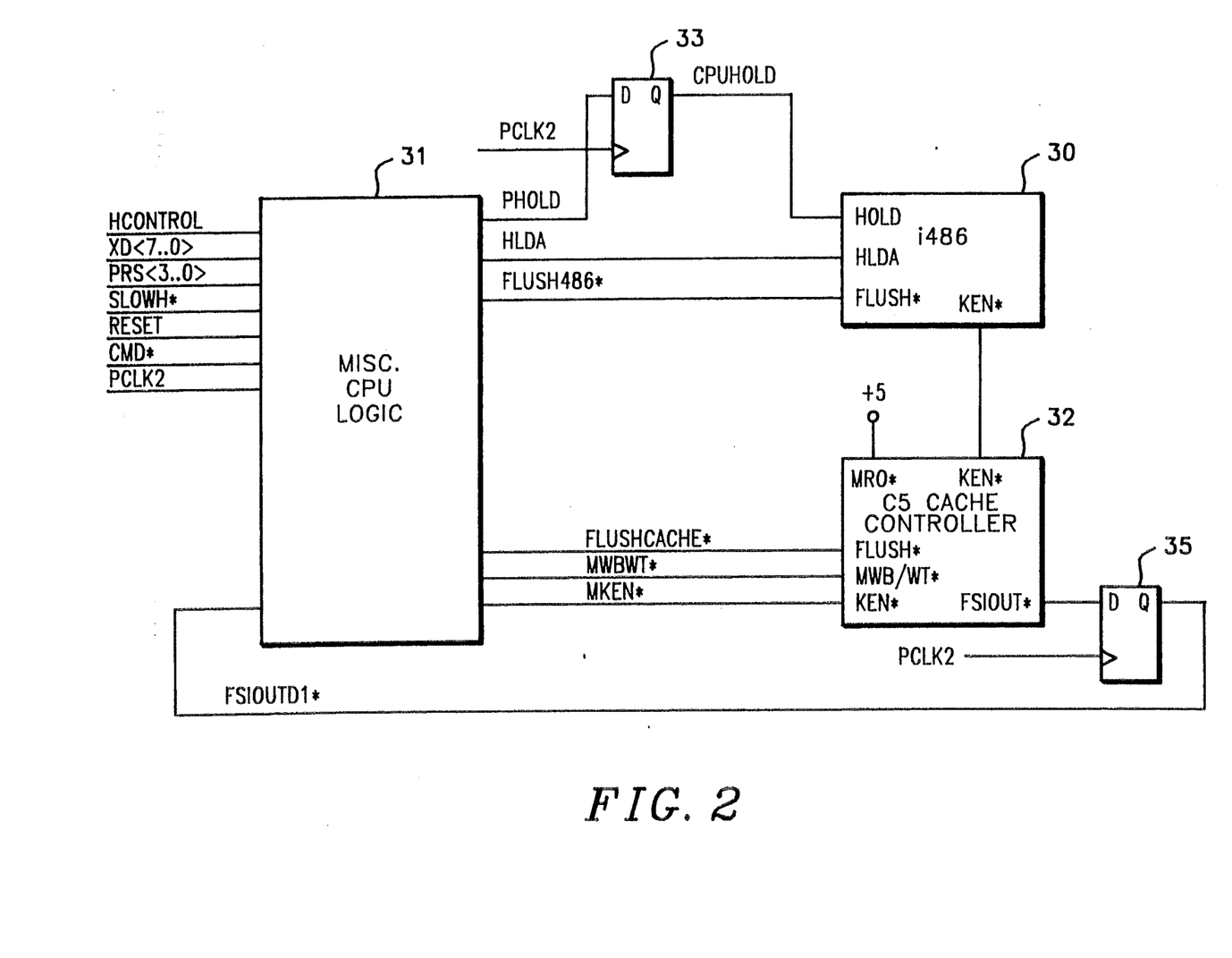
FIG. 2 is a more detailed block diagram of a portion of the computer system FIG. 1 relating to flushing the cache.

FIG. 2 shows the microprocessor 30, the cache controller 32, a portion of the miscellaneous CPU logic 31, and various connections between them. In FIG. 2, it can be seen that the FLUSH* input of the C5 cache controller 32 receives a signal referred to as FLUSHCACHE* from the miscellaneous CPU logic 31. When the FLUSHCACHE* signal is asserted, the cache controller 32 flushes the cache data RAMs 34. When the cache controller 32 recognizes the asserted FLUSHCACHE* signal, a signal referred to as FSIOUT, (flush/sync/initialization output) is activated by the cache controller 32 and provided through a flip-flop 35, which provides a signal referred to as FSIOUTD1* to the miscellaneous CPU logic 31. The flip-flop 35 is Clocked by the CLK2 or main system clock signal. When the flushing process completes, the FSIOUT, signal is de-asserted. The MRO, or memory read only input to the C5 cache controller 32 is connected to a logic high level so all cycles are considered read/write and none are write-protected. A signal referred to as MWBWT* or memory write-back/write-through is provided from the miscellaneous CPU logic 31 to the C5 cache controller 32 to indicate write-back or write-through status of the memory area. According to the present invention this signal indicates write-through areas for all write-protected areas and any other areas desired to be write-through. Further, the miscellaneous CPU logic 31 provides the MKEN* or memory cache enable signal to the KEN* input to indicate areas considered noncacheable. In the preferred embodiment the noncacheable areas do not include the write-protected areas. In addition, when a signal referred to as FCACHEN is low, indicating that the cache is disabled, the MKEN* signal is asserted to disable all caching.

The i486 microprocessor 30 includes an internal cache. As mentioned in the background, the i486 internal cache does not understand write-protected areas. The C5 cache controller 32, again as mentioned in the background does understand write-protected areas. To this end the KEN* or not cacheable address output of the C5 cache controller 32 is connected to the KEN* input of the i486 microprocessor 30 so that the C5 cache controller can disable caching for read only or write-protected areas. The internal cache is flushed by asserting the FLUSH* input low on the microprocessor 30. The miscellaneous CPU logic 31 generates a signal referred to as FLUSH486* which is connected to the FLUSH* input of the i486 microprocessor 30. When the FLUSH486* signal is asserted low, the microprocessor 30 flushes its internal cache.

Thus flush cycles of the microprocessor 30 and the cache controller 32 are controlled by the miscellaneous CPU logic 31. The internal and external cache systems each receive a different flush signal and thus each may be flushed independently because there are conditions where only one or the other cache is flushed. During all flush operations, the miscellaneous CPU logic 31 requests a processor hold by asserting a signal referred to as PHOLD. The PHOLD signal is input to a flip-flop 33, which generates a signal referred to as CPUHOLD, which is connected to the hold input of the microprocessor 30. The clock input of the flip-flop 33 receives the CLK2 signal. The CLK2 signal preferably operates at a frequency of 50 MHz. In response to the PHOLD signal, the microprocessor 30 floats most of its input/output pins. When the current processor cycle is completed, the microprocessor 30 asserts a hold acknowledge signal referred to as HLDA to acknowledge the hold request from the miscellaneous CPU logic 31. The HLDA signal is provided to an input of the miscellaneous CPU logic 31. When the HLDA signal is asserted by the processor 30, either or both of the FLUSH486* and FLUSHCACHE* signals are asserted low. As previously discussed, when the FLUSHCACHE* signal is asserted to the cache controller 32, the cache controller 32 flushes the cache. As mentioned, the cache controller 32 asserts the FSIOUT* signal low for the duration of the cache flush. While the FSIOUT* signal remains low, the miscellaneous CPU logic 31 maintains the high state of the PHOLD signal. When the flush operation completes, the FSIOUT* signal is negated high, at which time the miscellaneous CPU logic 31 de-activates the PHOLD signal to the microprocessor 30, allowing the resumption of operations.

Figure 3:
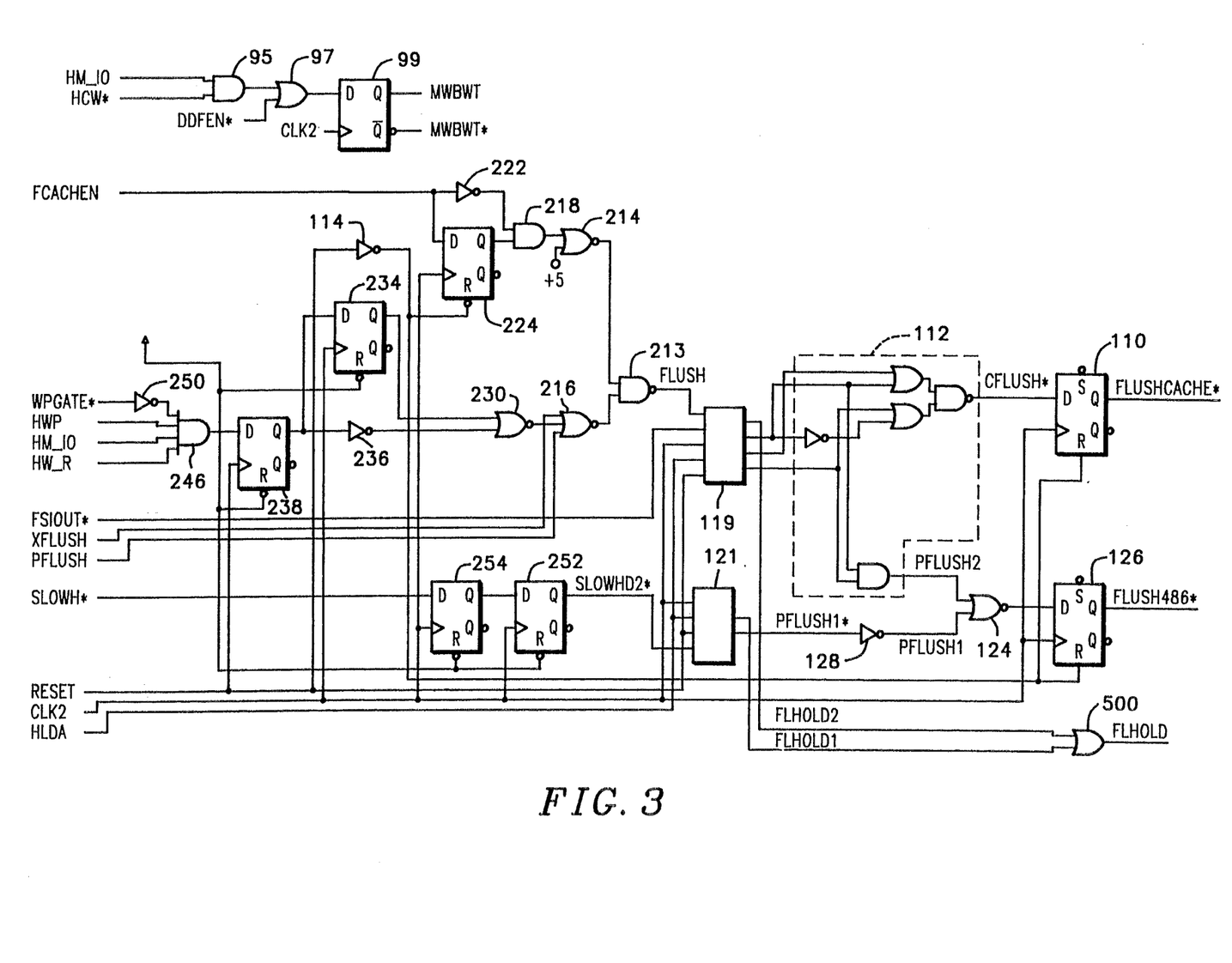
FIGS. 3 and 6 to 10 are schematic logic diagrams of circuitry in the miscellaneous CPU logic of FIG. 2.

Referring now to FIG. 3, a schematic logic diagram illustrates circuitry inside the miscellaneous CPU logic 31 which generates the FLUSHCACHE* and FLUSH486* signals. The logic generates the FLUSHCACHE* and FLUSH486* signals when certain conditions occur as is described in detail below. The logic includes D-type flip-flops which latch data on the rising edge of the clocking signal received at the clock input. The HMIO or memory or input/output signal from the HCONTROL bus and the HCW* or not write-back signal from the DDF 38 are provided as the two inputs to a two input AND gate 95. The output of the AND gate 95 and the DDFEN* or DDF not enabled signal are provided as the inputs to an OR gate 97. The output of the OR gate 97 is provided to the D input of a D-type flip-flop 99, which is clocked by the CLK2 signal. The inverted output of the flip-flop 99 provides the MWBWT* signal to the C5 cache controller 32 to indicate that a given location is write-through or writeback. In the preferred embodiment, all write-protected areas are also designated write-through so that the write operation quickly propagates to the host bus H for analysis and possible flush triggering. This input is cached by the C5 cache controller 32 so that later operations will be write through if so designated.

The FLUSHCACHE* signal is generated from the output of a flip-flop 110 whose input receives a signal referred to as CFLUSH*. The CFLUSH* signal is developed at one output of decode logic 112. The decode logic 112 is used in conjunction with next state signals provided by a state machine 119, which is detailed in FIG. 4 below. The clock input of the flip-flop 110 is connected to the system clocking signal CLK2. The reset input of the flip-flop 110 is connected to the output of an inverter 114, whose input is connected to the system RESET signal. An additional output of the decode logic 112 is referred to as PFLUSH2 and is connected to an input of a two input NOR gate 124. A signal referred to as PFLUSH1* is provided by a state machine 121 and is connected to the input of an inverter 128 whose output is a signal referred to as PFLUSH1. The PFLUSH1 signal is connected to the other input of the NOR gate 124. The output of the NOR gate 124 is connected to the D input of a flip-flop 126. The clock input of the D-type flip-flop 126 receives the CLK2 signal, and the reset input is connected to the output of the inverter 114. The output of flip-flop 126 generates the FLUSH486* signal.

A FLUSH signal is provided to the state machine 19 and is generated by the output of a two input NAND gate 213. The inputs of the NAND gate 213 are connected to the output of a two input NOR gate 214, and the output of a three input NOR gate 216. The inputs of the NOR gate 214 are connected to the outputs of a two input AND gate 218 and to a logic high level. The inputs of the AND gate 218 are connected to the output an of inverter 222 and the Q output of a D-type flip-flop 224. The input of the inverter 222 is connected to the FCACHEN or cache enable signal. The D input of the flip-flop 224 receives the FCACHEN signal. Two inputs of the NOR gate 216 are connected to signals referred to as XFLUSH and PFLUSH for processor and external flush requests. The remaining input is connected to the output of a two input NOR gate 230.

The inputs of the NOR gate 230 are connected to the output of a D-type flip-flop 234 and the output of an inverter 236, whose input is connected to the output of flip-flop 238. The input of the flip-flop 234 is connected to the output of the flip-flop 238. The clock inputs of the flip-flops 224, 234, and 238 are connected to the CLK2 signal, and the inverted reset inputs of the flip-flop 234 and 238 are connected to a logic high level. The inverted reset input of the flip-flop 224 is connected to the output of the inverter 114, whose input is connected to the RESET signal.

The D input of the flip-flop 238 is connected to the output of the AND gate 246. Three inputs of the AND gate 246 are connected to signals referred to as HWP, HMIO, and HWR. The remaining input of the AND gate 246 is connected to the output of inverter 250, whose input is connected to a signal referred to as WPGATE*.

The HWP (Host Write Protect) signal indicates, when asserted high, that the current processor address points to write-protected memory. When the HWP signal is high, in the preferred embodiment the HCW* signal is set to indicate write-through, so that when the write operation propagates to the host bus H, the HWP signal is returned by the DDF logic 38 to allow monitoring for this condition. The above-described circuit asserts the FLUSH signal under several conditions. First, the FLUSH signal is asserted when the PFLUSH signal is asserted. As described below, the PFLUSH signal is activated when a write operations occurs to a control port, indicating a RAM relocation operation or a flush request. The FLUSH signal is also asserted when the XFLUSH signal is asserted, which is also described below. The XFLUSH signal is asserted when the microprocessor 30 executes certain special cycles. The HWP, WPGATE*, HWR, and HMIO signals are used to determine when a special cycle according to the present invention occurs. The WPGATE, (Write Protect Gate) signal is asserted low when the HWP signal is valid for sampling. The HMIO (Host Memory/IO Status) signal indicates whether the current operation is a memory operation or an I/O operation, and the HWR (Host Write/Read Status Line) signal indicates whether the current operation is a read or a write. The HWR signal is a logic high value when a write operation occurs, and is a logic low value when a read operation occurs.

The FLUSH signal is asserted by the above circuit when a write operation to write protected memory occurs. As shown in FIG. 3, the AND gate 246 produces a logic high value if the HWP, HMIO, and HWR signals are a logic high value and the WPGATE* is asserted low. When these conditions occur, the current operation is writing to a write-protected memory address. This is a condition where the caches must be flushed to prevent a possible incoherency from existing for more than a momentary period to properly emulate write protection in the caches. Thus the NOR gate 230 provides an indication of a need for a write-protected area violation flush. When combined with the XFLUSH and PFLUSH signals this is an indication of various flush requests. The output of the NOR gate 216 is combined with the output of NOR gate 214 which indicates the cache has been disabled, a further indication of a need to flush the cache. Thus the output of the NAND gate 213 provides a combined cache flush request signal to the state machine 119.

The SLOWHD2* signal is generated by the output of a D-type flip-flop 252. The D input of the flip-flop 252 is connected to the Q output of a D-type flip-flop 254. The clock inputs of the flip-flops 252 and 254 are connected to the CLK2 signal. The reset inputs of the flip-flops 252 and 254 are tied to a logic high value. The D input of the flip-flop 254 is connected to a signal referred to as SLOWH*. The SLOWH* signal is a slow down request signal. The SLOWH* signal is generated externally, and indicates that a slow down situation is occurring. The SLOWH* signal indicates, when asserted low, that the microprocessor's internal cache should be flushed. Therefore, the SLOWH* signal causes the PFLUSH1 signal to be asserted, causing a flush of the internal cache. It is noted that the external cache is not flushed in this case.

Figure 4:
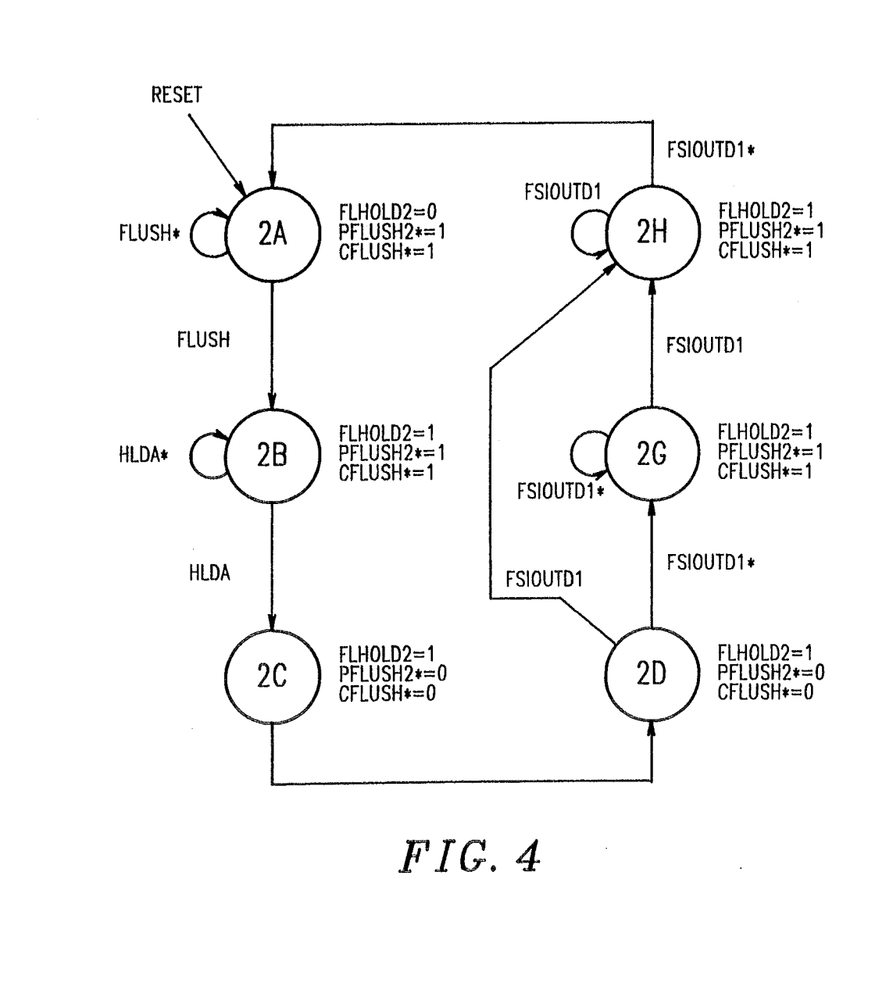
FIGS. 4 and 5 are state transition diagrams of portions of the miscellaneous CPU Logic of FIG. 2.

Referring now to FIG. 4, a state diagram illustrating the operation of the state machine 119 is shown. The state machine 119 determines when the FLHOLD2* PFLUSH2*, and CFLUSH* signals are asserted. The state machine 119 is developed using a series of 3 D-type flip-flops clocked by the CLK2 signal, with appropriate combinatorial logic providing inputs to the flip-flops to cause the state machine 119 to traverse the states as shown. The inputs to the flip-flops are thus the next state signals which are provided to the decode logic 112. By providing the next state signals from the state machine 119, the FLUSHCACHE* and FLUSH486* signals can be produced on the same CLK2 signal edge which clocks the state machine 119 to the states where the PFLUSH2* and CFLUSH* signals are stated as being asserted or negated, thus saving one CLK2 signal cycle in their assertion. Thus it is understood that the actual CFLUSH* and PFLUSH2 signals from the decode logic 112 may actually be present slightly before they are indicated as being asserted by the state machine 119, but this allows the FLUSHCACHE* and FLUSH486* signals to be asserted one CLK2 signal cycle earlier and yet be synchronized. The state machine 119 begins in state 2A, and all states lead to this state when the RESET signal is asserted. In state 2A, the idle state, the FLHOLD2 signal is negated low and the PFLUSH2* and CFLUSH* signals are negated high. The state machine 119 transitions from state 2A to state 2B when the FLUSH signal is asserted. As previously mentioned, the FLUSH signal is asserted when certain conditions indicate that a flush operation is necessary. In state 2B, the FLHOLD2 signal is asserted high to assert the HOLD signal to the processor 30, and the PFLUSH2* and CFLUSH* signals are negated high, pending an asserted HLDA signal. The state machine 119 remains in state 2B while the HLDA signal is negated. The state machine 119 transitions from state 2B to state 2C when the HLDA signal is asserted high, indicating that the processor 30 has acknowledged a hold request. In state 2C, the FLHOLD2 signal is asserted high, and the PFLUSH2* and CFLUSH* signals are asserted low. The state machine 119 transitions from state 2C to state 2D on the next CLK2 signal cycle. In state 2D, the FLHOLD2 signal remains asserted high, and the PFLUSH2 and CFLUSH signals remain asserted low. The state machine 119 transitions from state 2D to state 2H when the condition:

FSIOUTD1 is true, which indicates that the flush operation has started. The state machine 119 transitions from state 2D to state 2G when the condition:

FSIOUTD1* is true, which indicates that the flush operation has not started.

In state 2G, the FLHOLD2 signal is asserted high and the PFLUSH2* and CFLUSH* signals are negated high. The state machine 119 remains in state 2G while the FSIOUT signal is negated, waiting for the flush operation to start.

The state machine 119 transitions from state 2G to state 2H when the FSIOUTD1 signal is asserted, indicating that the flush operation has started. The FLHOLD2 signal is asserted high and the PFLUSH2 and CFLUSH signals are negated high in this state. The state machine 119 remains in state 2H while the FSIOUTD1* signal is asserted low, indicating that the flush operation is continuing. The state machine 119 transitions from state 2H to state 2A when the FSIOUTD1* signal is negated high, indicating the flush is completed. The state machine 119 loops at state 2A waiting for the next flush request.

Figure 5:
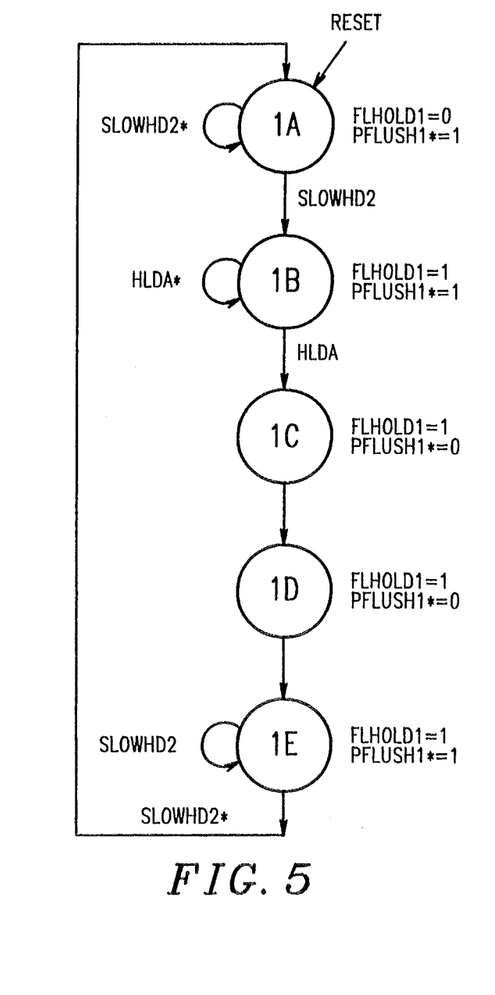

Referring now to FIG. 5, a state transition diagram illustrating the operation of the state machine 121 is shown. The state machine 121 determines when the FLHOLD1 and PFLUSH1* signals are asserted. The state machine 121 begins in state 1A, and all states lead to this state when the RESET signal is asserted. In state 1A, the FLHOLD1 signal is negated low, and the PFLUSH1* is negated high. The state machine 121 remains in state 1A while the SLOWHD2* signal is negated. The state machine 121 transitions from state 1A to state 1B when the SLOWHD2* signal is asserted low. In state 1B, the PFLUSH1* signal remains negated and the FLHOLD1 signal is asserted high. The state machine 121 remains in state 1B while the HLDA signal is negated. The state machine 121 advances from state 1B to state 1C when the HLDA signal is asserted, indicating that the processor 30 has acknowledged the hold request. In state 1C, the FLHOLD1 signal is asserted high and the PFLUSH1* signal is asserted low. The state machine 121 transitions from state 1C to state 1D on the next CLK2 signal cycle. In state 1D, the FLHOLD1 signal is asserted and the PFLUSHi* signal is asserted low. The state machine 121 transitions from state 1D to state 1E on the next CLK2 signal cycle. In state 111, the FLHOLD1 signal is asserted and the PFLUSH1* signal is negated. The state machine 121 remains in state 1E while the SLOWHD2* signal is asserted. The state machine 121 advances from state 1E to state 1A when the SLOWHD2* signal is negated.

Background on the signals used in the following description is deemed appropriate. Signals referred to as PRS<3:0> are addressing signals used by the processor 30 to address control ports in the computer system and are valid according to timing from the CMD* signal provided on the EISA bus E. Please refer to the previously referenced patent applications for more details.

Figure 6:
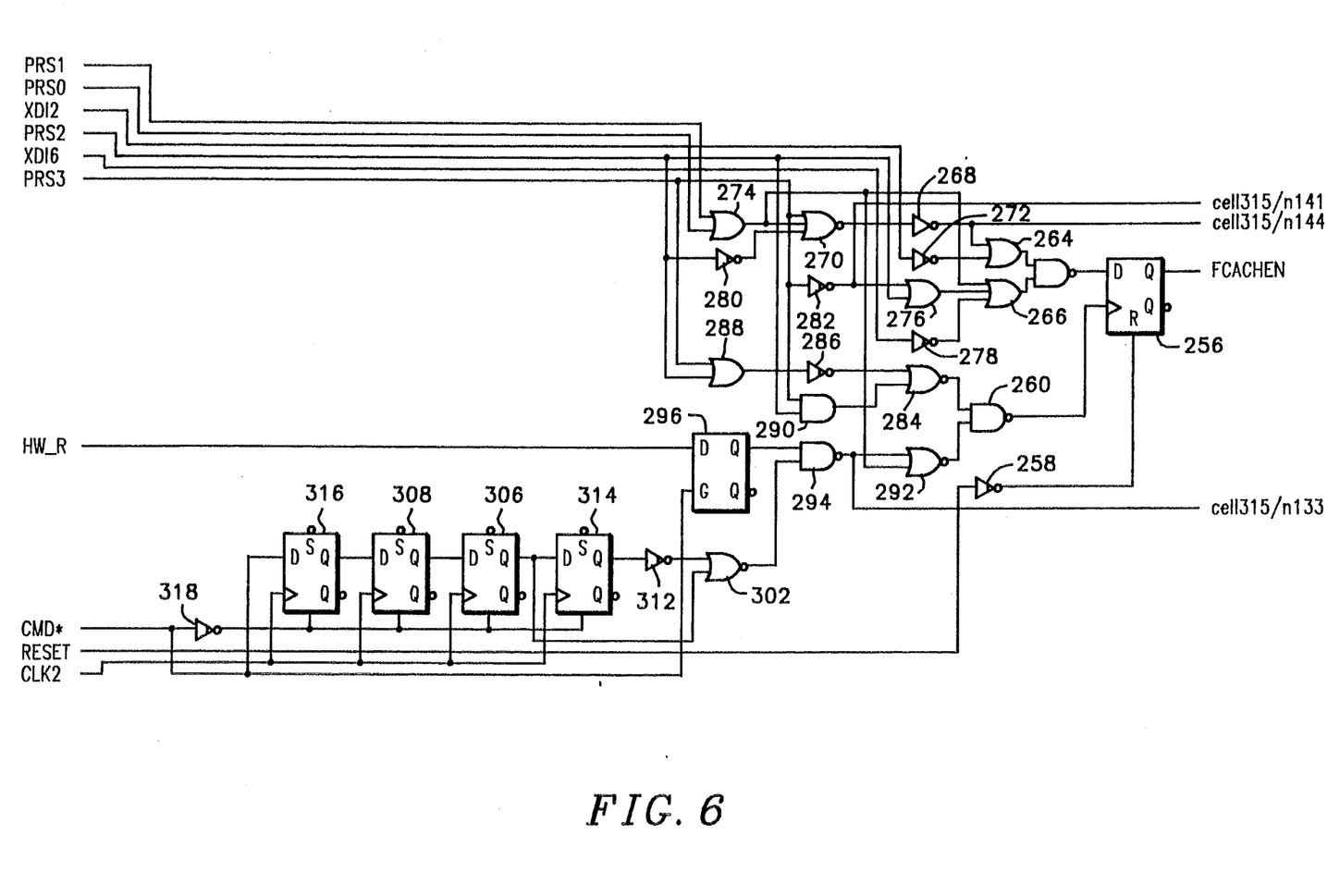

FIG. 6 illustrates various decoding circuitry and the cache enable register. As previously discussed, the asserted FCACHEN signal causes the FLUSH signal to be asserted. The FCACHEN signal is asserted high when the cache has been enabled, and is subsequently disabled. The FCACHEN signal is generated by the output of a D type flip-flop 256. The reset input of the flip-flop 256 is connected to the output of an inverter 258, whose input is connected to the RESET signal. The clock input of the flip-flop 256 is connected to the output of a two input NAND gate 260, and the D input of the flip-flop 256 is connected to the output of a two input NAND gate 262. The inputs of the NAND gate 262 are connected to the output of a two input OR gate 264 and the output of a two input OR gate 266. One input of the OR gate 264 is connected to the output of an inverter 268, whose input is connected to the output of a three input NOR gate 270. The output of the inverter 268 is a signal referred to as cell 315/n144. The other input of the OR gate 264 is connected to the output of an inverter 272, whose input is connected to a signal referred to as XDI2. The XDI2 signal is data bit 2 on the XD data bus. The inputs of the OR gate 266 are connected to the output of an OR gate 274, the output of an OR gate 276, and the output of an inverter 278, whose input is connected to a signal referred to as XDI6, which is data bit 6 from the XD data bus.

The NOR gate 270 has three inputs. The first input is connected to the PRS3 signal. The second input is connected to the output of OR gate 274. The third input of NOR gate 270 is connected to the output of inverter 280, whose input is connected to the PRS2 signal. The first input of OR gate 276 is connected to the output of inverter 282, which is a signal referred to as cell 315/n141, whose input is connected to the PRS3 signal. The second input of OR gate 276 is connected to the PRS2 signal. The first input of OR gate 274 is connected to the PRS1 signal. The other input of OR gate 274 is connected to the PRS0 signal.

The NAND gate 260 has two inputs, the first of which is connected to the output of a NOR gate 284. The second input of the NAND gate 260 is connected to the output of NOR gate 292. The first input of the NOR gate 284 is connected to the output of inverter 286, whose input is connected to the output of an OR gate 288. The inputs of the OR gate 288 are the PRS2 and PRS3 signals. The second input of the NOR gate 284 is connected to the output of an AND gate 290. The first input of the NOR gate 292 is connected to the output of a NAND gate 294. The second input of the NOR gate 292 is connected to the output of the OR gate 274.

The first input of the AND gate 290 is connected to the PRS3 signal. The second input of the AND gate 290 is connected to the PRS2 signal. The first input of the NAND gate 294 is connected to the output of a latch 296, and the second input of the NAND gate 294 is connected to the output of a NOR gate 302. The D input of the latch 296 is connected to the HWR signal. The gate input of the latch 296 is connected to the CMD signal provided from the EISA bus E to indicate the data portion of a cycle. The NOR gate 302 also has two inputs. The first input of the NOR gate 302 is connected to the output of inverter 312, whose input is connected to the Q output of a D-type flip-flop 314. The second input of NOR gate 302 is connected to the Q output of a flip-flop 306. The D input of the flip-flop 314 is connected to the output of the flip-flop 306. The D input of the flip-flop 306 is connected to the output of a flip-flop 308. The D input of the flip-flop 308 is connected to the output of a flip-flop 316. The D input of the flip-flop 316 receives the CMD* signal.

The clock inputs of the flip-flops 306, 308, 314 and 316 are connected to the CLK2 signal. The set input of each of the flip-flops 306, 308, 314 and 316 is connected to the output of an inverter 318, whose input is connected to the CMD* signal.

The above circuit is used to disable the external and internal cache after the caches have been enabled. The cache is enabled by setting a particular bit true at a particular address following power up. The cache can be disabled by clearing the same bit at the same address. When this occurs, both the internal cache and the external cache are flushed. As previously noted, the PRS<3..0> signals are address signals and the address where the cache enable bit is located is decoded by the above described logic signals. If the XDI6 signal is changed from high to low during a write operation to the PRS bus at 1000, the FCACHEN signal is activated and both caches are then flushed.

Figure 7:
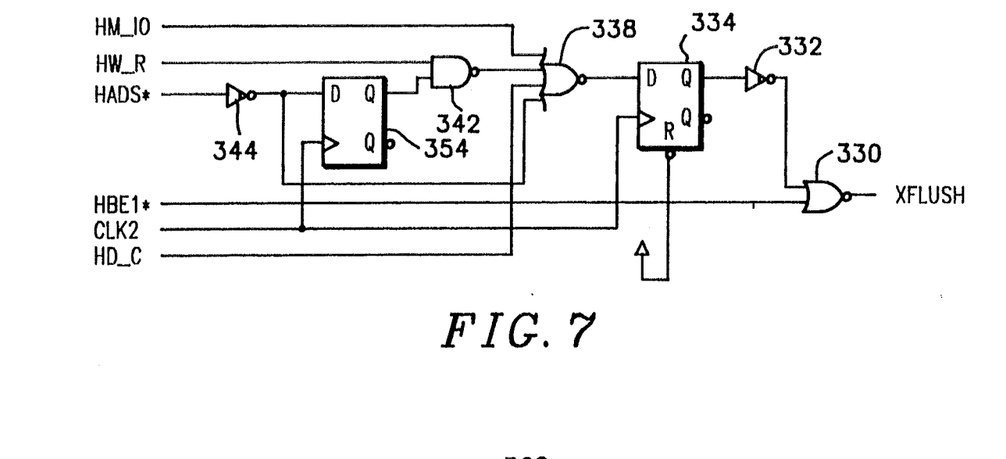

The XFLUSH signal is asserted when the microprocessor 30 executes an INVD instruction which is a special cycle of the i4861 processor 30 decoded from the HBE1*, HWR, HMIO and HDC signals in the HCONTROL bus. Referring now to FIG. 7, the XFLUSH signal is generated by the output of NOR gate 330. The first input of NOR gate 330 is connected to the output of inverter 332 whose input is connected to the Q output of flip-flop 334. The second input of NOR gate 330 is connected to the HBE1* signal, which is the host data byte enable 1 signal. The clock input of the flip-flop 334 is connected to the CLK2 signal. The reset input of the flip-flop 334 is tied high. The D input of the flip-flop 334 is connected to the output of a four input NOR gate 338. The first input of the NOR gate 338 is connected to the HMIO signal and the second input of NOR gate 338 is connected to the output of a NAND gate 342. The third input of the NOR gate 338 is connected to the HDC (Host Data/Code Status) signal, and the fourth and final input of the NOR gate 338 is connected to the output of an inverter 344, whose input is connected to the HADS* signal, the address status valid strobe signal.

The first input of the NAND gate 342 is connected to the HWR signal, and the second input of the NAND gate 342 is connected to the Q output of a flip-flop 354. The clock input of the flip-flop 354 is connected to the CLK2 signal. The D input of the flip-flop 354 is connected to the output of an inverter 344, whose input is connected to the HADS* signal.

Thus, the XFLUSH signal is asserted when an INVD command is executed by the microprocessor 30. The INVD command is a special cycle executed by the processor 30 to invalidate the cache. The internal and external caches flush when the HMIO, HDC, and HBE1, signals are in a designated state. When this occurs, the INVD command has been executed and the XFLUSH signal is activated high, causing the cache to flush.

Figure 8:
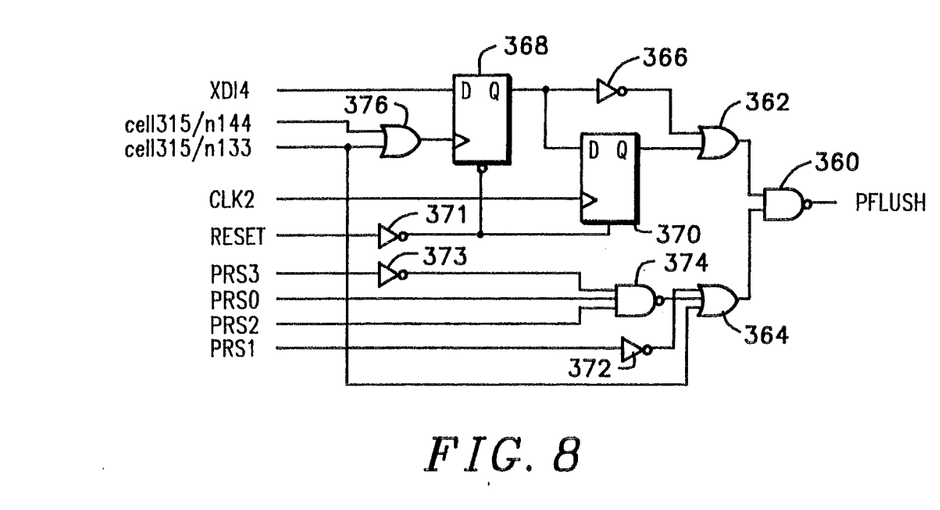

The PFLUSH signal is asserted whenever a write to one of certain addresses occurs. A write to one of these addresses indicates a RAM relocation or a flush request from a processor control port. Referring now to FIG. 8, the PFLUSH signal is generated by the output of a NAND gate 360. The first input of the NAND gate 360 is connected to the output of an OR gate 362, and the second input of the NAND gate 360 is connected to the output of an OR gate 364. The first input of the OR gate 362 is connected to the output of an inverter 366, whose input is connected to the Q output of a flip-flop 368. The second input of OR gate 362 is connected to the output of an flip-flop 370. The OR gate 364 has three inputs, the first of which is connected to the output of inverter 372, whose input is connected to the PRS1 signal. The second input of the OR gate 364 is connected to the output of a NAND gate 374, and the third input of OR gate 364 is connected to the cell 315/n133 signal.

The clock input of the flip-flop 370 is connected to the CLK2 signal. The reset input of the flip-flop 370 is connected to an inverter 371, whose input is connected to the RESET signal. The D input of flip-flop 370 is connected to the Q output of the flip-flop 368. The NAND gate 374 has three inputs, the first of which is connected to an inverter 373, whose input is connected to the PRS3 signal. The second input of the NAND gate 374 is connected to the PRS0 signal. The third input of the NAND gate 374 is connected to the PRS2 signal. The clock input of the flip-flop 368 is connected to the output of an OR gate 376. The reset input of the flip-flop 368 is connected to the inverted RESET signal. The D-input of the flip-flop 368 is connected to the XDI4 or XD data bus bit 4 signal. The first input of the OR gate 376 is connected to the cell 315/n144 signal. The second input of the OR gate 376 is connected to the cell 315/n133 signal. Referring again to FIG. 6, as previously noted the cell 315/n144 signal is generated by the output of inverter 268, whose input is connected to NOR gate 270. The cell 315/n144 signal is thus driven low when PRS<3..0>=0100 which is an access to a respective port a register in the system C. The cell 315/n133 signal is generated by the output of NAND gate 294 so that it is asserted low when the current command is a write operation. A write operation to PRS<3:0>=0100 thus clocks the flip-flop 368. If bit 4 of the register is asserted, the PFLUSH signal is asserted to generate a cache flush.

With this circuit, the PFLUSH signal is asserted under the following two conditions. First, a write by the microprocessor 30 to a specific address PRS address 0100 asserts the PFLUSH signal. If bit 4 of the register, the flush bit, is set during this write, the flush procedure is started. Thus, if the XDI4 signal is a logic high value during a write command to PRS<3:0>=0100, the flush procedure begins.

The second condition under which the PFLUSH signal is activated is during a RAM relocation. The computer system C includes a register referred to as the RAM relocation register which allows software to remap the memory. Before the memory is remapped, the internal and external caches must be flushed to return dirty data to the memory before the remapping can be performed. Consequently, a flush is commenced when any write operations to the RAM relocation register are detected.

Figure 9:
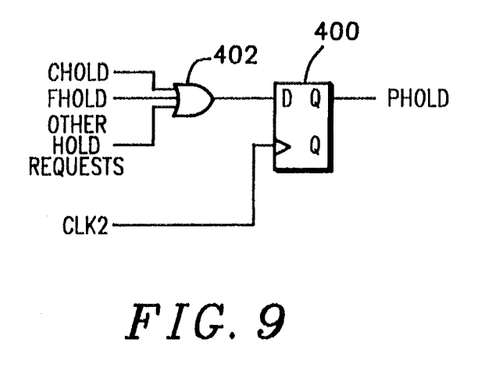

As previously discussed, while the flush operation is in process, the microprocessor 30 is placed in a hold state. Referring now to FIG. 9, the PHOLD signal is generated by the Q output of a flip-flop 400, whose clock input is connected to the CLK2 signal. The D input of the flip-flop 400 is connected to the output of a three-input OR gate 402. The inputs of the OR gate 402 are connected to the CHOLD signal, the FLHOLD signal, and a series of other hold requests not associated with the present invention, such as reset. The PHOLD signal is thus asserted when any of these hold inputs are asserted.

The FHOLD signal is produced by a two input OR gate 500 (FIG. 3). The inputs to the OR gate 500 are the FLHOLD1 signal from the state machine 121 and the FLHOLD2 signal from the state machine 119. Thus the FHOLD signal is generated during flushes generated by slow down operations or writes to write-protected areas.

Figure 10:
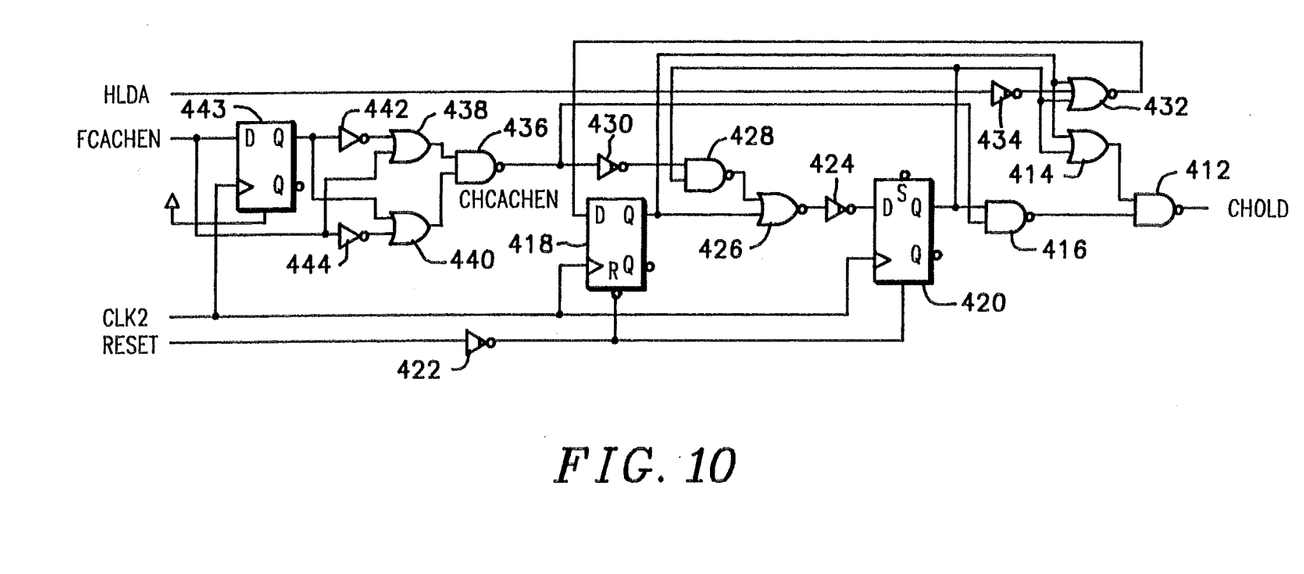

The CHOLD signal is generated when the cache enable bit is disabled or enabled. Referring now to FIG. 10, the CHOLD signal is generated by the output of NAND gate 412. The first input of NAND gate 412 is connected to the output of OR gate 414. The other input of NAND gate 412 is connected to the output of NAND gate 416. The first input of OR gate 414 is connected to the Q output of a D-type flip-flop 418. The other input of OR gate 414 is connected to the output of flip-flop 420. The first input of NAND gate 416 is connected to the Q output of a D-type flip-flop 420, and the other input of NAND gate 416 is connected to a signal referred to as CHCACHEN developed by a NAND gate 436.

The clock input of flip-flop 420 is connected to the CLK2 signal, and the set input of the flip-flop 420 is provided by the output of inverter 422, whose input is connected to the RESET signal. The D input of flip-flop 420 is connected to the output of inverter 424, whose input is connected to the output of NOR gate 426. The first input of NOR gate 426 is connected to the output of AND gate 428, and the second input of NOR gate 426 is connected to the Q output of flip-flop 418.

The first input of AND gate 428 is connected to the output of inverter 430, whose input is the CHCACHEN signal, which is connected to the output of NAND gate 436. The second input of AND gate 428 is connected to the output of flip-flop 420.

The clock input of flip-flop 418 is connected to the CLK2 signal, and the reset input of flip-flop 418 is connected to the output of inverter 422. The D input of flip-flop 418 is connected to the output of NOR gate 432. The first input of NOR gate 432 is connected to the Q output of flip-flop 418, the second input of NOR gate 432 is connected to the output of inverter 434, and the third input of NOR gate 432 is connected to the Q output of the flip-flop 420. The input of inverter 434 is connected to the HLDA signal from the processor 30.

The first input of NAND gate 436 is connected to the output of OR gate 438, and the second input of NAND gate 436 is connected to the output of OR gate 440. The first input of OR gate 438 is connected to the FCACHEN signal, and the second input of OR gate 438 is connected to the output of inverter 442, whose input is connected to the Q output of a D-type flip-flop 443. The first input of OR gate 440 is connected to the Q output of flip-flop 443, and the second input of OR gate 440 is connected to the output of inverter 444, whose input is connected to the FCACHEN signal. The clock input of flip-flop 443 is connected to the CLK2 signal, and the D input of flip-flop 443 is connected to the FCACHEN signal.

The flip-flops 418 and 420 and associated cominatorial logic form a simple state machine which asserts the CHOLD signal on receipt of the CHCACHEN signal and until the HLDA signal is received, at which time the CHOLD signal is released. If the cache is being disabled, the state machine 119 will hold the FLHOLD signal until the flush operation is complete. If the cache is being enabled, this short hold allows the C5 cache controller 32 time to activate and synchronize.

In review, the write-protected memory areas in the preferred embodiment are designated as write-through and write-protect. However, the C5 cache controller is only informed that these areas are write-through. This allows the areas to be cached in the i486. When a write operation to this area is performed, the operation is a write-through and so can be recognized by logic according to the present invention. The logic recognizes the write to a write-protected area and initiates a flush of the caches. This removes any non-transitory incoherency and thus allows caching of write-protected information in the internal cache of the i486 while utilizing the C5 cache controller.

The foregoing disclosure and description of the invention are illustrative and explanatory thereof, and various changes in the size, components, construction and method of operation may be made without departing from the spirit of the invention.

We claim:

1. A computer system, comprising:
    a microprocessor;
    first cache memory coupled to said microprocessor;
    a first cache memory controller coupled to said microprocessor and said first cache memory and having a noncacheable input;
    second cache memory coupled to said first cache memory;
    a second cache memory controller coupled to said second cache memory and said first cache memory controller, said second cache memory controller including a write-protect input and providing a signal to said first cache memory controller noncacheable input when a memory location is write-protected;
    main memory coupled to said second cache memory controller and said second cache memory, wherein portions of said main memory are write-protected and are indicated as not write-protected to said second cache memory controller;
    means coupled to said second cache memory controller for detecting a write operation to said write-protected portions of said main memory; and
    means coupled to said first and second cache memory controllers and said means for detecting a write operation for causing said first and second cache memory controllers to initiate flushing of said first and second cache memories upon detection of a write operation to said write-protected portion of main memory wherein each of said first and second cache memory controllers include a flush input and wherein said flush initiation means includes means for providing a first signal to said flush input of said first cache memory controller and a second signal to said flush input of said second cache memory controller and further includes a means for providing said first signal without providing said second signal in response to a predetermined condition.

2. The system of claim 1, wherein said flush initiation means includes means for holding microprocessor operations while said first and second cache memories are being flushed.

3. The system of claim 2, wherein said microprocessor includes a hold input and provides a hold acknowledgement signal when in a held state; wherein said first and second cache memory controllers include a flush input and said second cache memory controller provides a flush in progress signal; and wherein said microprocessor operations holding means comprises:
    means for requesting a hold on microprocessor operations;
    means coupled to said microprocessor for determining when said hold acknowledgement signal has been provided; and
    means coupled to said hold acknowledgement determining means and said first and second cache memory controllers for providing a flush request to said first and second cache memory controllers after receiving said hold acknowledgement signal.

4. The system of claim 3, wherein said microprocessor operations holding means further includes means coupled to said microprocessor and said second cache memory controller for maintaining the hold on microprocessor operations while the flushing is in progress.

* * * * *